(12) United States Patent
Paparella et al.

(10) Patent No.: US 7,743,165 B2
(45) Date of Patent: Jun. 22, 2010

(54) DATA DISTRIBUTION TO NODES OF A TELECOMMUNICATION NETWORK

(75) Inventors: Andrea Paparella, Busto Arsizio (IT); Roberto Riglietti, Vimercate (IT); Pasquale Donadio, Naples (IT)

(73) Assignee: Alcatel, Paris (FR)

( * ) Notice: Subject to any disclaimer, the term of this patent is extended or adjusted under 35 U.S.C. 154(b) by 373 days.

(21) Appl. No.: 11/488,043

(22) Filed: Jul. 18, 2006

(65) Prior Publication Data

US 2007/0070903 A1    Mar. 29, 2007

(30) Foreign Application Priority Data

Sep. 26, 2005   (EP) .................. 05291995

(51) Int. Cl.
*G06F 15/16* (2006.01)
(52) U.S. Cl. ...................... 709/236; 709/238
(58) Field of Classification Search ............... 709/236
See application file for complete search history.

(56) References Cited

U.S. PATENT DOCUMENTS 4,464,650 A * 8/1984 Eastman et al. ............. 341/51
4,814,746 A * 3/1989 Miller et al. ................ 341/95
6,772,204 B1   8/2004 Hansen 2002/0095513 A1 * 7/2002 Lin et al. .................... 709/238
2003/0088537 A1   5/2003 Ko
2005/0038912 A1   2/2005 Ghirardi
2006/0069778 A1 * 3/2006 Ikegawa ..................... 709/225
2007/0016693 A1 * 1/2007 Goodrich ................... 709/247

FOREIGN PATENT DOCUMENTS

WO    WO 03/013099 A      2/2003
WO    WO 03013099 A1 *    2/2003

OTHER PUBLICATIONS

Wikipedia, "Lempel-Ziv-Welch", Aug. 26, 2009.*

* cited by examiner

*Primary Examiner*—Vivek Srivastava
*Assistant Examiner*—Ryan J Jakovac
(74) *Attorney, Agent, or Firm*—Carmen Patti Law Group, LLC (57) ABSTRACT

Disclosed is a method of distributing data in a telecommunication network, the network comprising a central node, a first target node and a second target node. The method comprises: a) providing a first file comprising at least a first compressed data set addressed to the first target node and a second compressed data set addressed to the second target node; b) identifying in the first file at least a first file portion comprising the first compressed data set and a second file portion comprising the second compressed data set; and c) forwarding the first file portion to the first target node, and forwarding the second file portion to the second target node, wherein the steps b) and c) are performed in the central node.

18 Claims, 7 Drawing Sheets

DATA DISTRIBUTION TO NODES OF A TELECOMMUNICATION NETWORK

BACKGROUND OF THE INVENTION

1. Field of the Invention

The present invention relates to a method of distributing data to the network nodes of a telecommunication network. The present invention further relates to a telecommunication network for implementing the above method.

This application is based on and claims the benefit of European Patent Application No 05291995.8 filed on Sep. 26, 2005, which is incorporated by reference herein.

2. Description of the Prior Art

A telecommunication network generally comprises a plurality of network nodes. Such network nodes are adapted to route and switch traffic flows across the network. In order to perform routing and switching, a network node typically comprises devices such as switches, cross-connects, add-drop multiplexers or the like.

Besides, a node typically comprises a local database, which contains management information (software, metrics, configuration data, scheduling data, logs etc.) for configuring, operating and managing the above devices.

In some cases, it may be required to distribute management information to all the nodes of a network. For instance, when a failure occurs in the network, a management information distribution may be required so that the local database content of each node can be updated/restored.

In the following description and in the claims, the expression "data set" will refer to a set of management information to be distributed to a node, so that the node can store it into its local database, independently from the type and/or content of the management information constituting such a data set (software, metrics, etc.).

Distributing data sets may be performed in a centralised way, all the nodes of a same network being connected (directly or through other nodes) to a network manager.

The network manager sends to each node its respective data set through a dedicated management channel. For instance, in Synchronous Digital Hierarchy (SDH) networks, data sets may be transmitted from the network manager through the so-called Data Communication Channel (DCC).

A network manager can simultaneously send to more than one node the respective data sets. The number of nodes that can be updated and/or restored simultaneously depends on the management channel bandwidth and on the data set size. In some cases, the management channel bandwidth can be rather narrow (for instance, 176 kbit/s for the above cited DCC). Moreover, the data set size is increasing, due to the increasing complexity of the network nodes and the consequent increasing amount of required management information. Thus, in these cases, only few nodes can be simultaneously updated/restored, thus implying an overall network updating/restoring time (and thus cost) which is often unacceptable.

SUMMARY OF THE INVENTION

The object of the present invention is providing a method of distributing data which allows to reduce the overall updating/restoring time of a telecommunication network in comparison with the known methods.

According to a first aspect, the present invention provides a method of distributing data in a telecommunication network, the network comprising a central node, a first target node and a second target node, wherein it comprises:

a) providing a first file comprising at least a first compressed data set addressed to the first target node and a second compressed data set addressed to the second target node;

b) identifying in the first file at least a first file portion comprising the first compressed data set and a second file portion comprising the second compressed data set; and c) forwarding the first file portion to the first target node, and forwarding the second file portion to the second target node, wherein the steps b) and c) are performed in the central node.

Preferably, step a) comprises the step of compressing at least a first data set and a second data set through a compression algorithm with a dictionary.

Preferably, step a) comprises the step of including at least a part of the dictionary in the first file.

Preferably, step a) further comprises providing the first compressed data set with a first header which includes an identifier of the first target node, and the second compressed data set with a second header which includes an identifier of the second target node.

According to a second aspect, the invention provides a network manager of a telecommunication network, the telecommunication network comprising a central node, a first target node and a second target node, wherein the network manager comprises a compression module for compressing a first data set addressed to the first target node and for compressing a second data set addressed to the second target node, thus obtaining a first compressed data set and a second compressed data set, wherein the compression module applies a compression algorithm to the whole of the first and second data sets and further wherein the compression module provides a first file comprising at least the first compressed data set and the second compressed data set, the network manager further comprising transmission means for transmitting the first file to the central node.

Possibly, the network manager comprises a processor for executing the above compression module and a memory for storing the compression module and data sets.

Preferably, the compression module applies a compression algorithm with a dictionary and wherein the first file includes at least a part of the dictionary.

Preferably, the compression module is also adapted to include in the first file a first header which includes an identifier of the first target node and a second header which includes an identifier of the second target node.

According to a third aspect, the present invention provides a network node of a telecommunication network, wherein it comprises:

a receiver for receiving a first file, the first file comprising at least a first compressed data set addressed to a first target node and a second compressed data set addressed to a second target node;

an identifying module for identifying in the first file at least a first file portion comprising the first compressed data set and a second file portion comprising the second compressed data set; and a forwarder for forwarding the first file portion to the first target node, and forwarding the second file portion to the second target node.

According to a fourth aspect, the present invention provides a telecommunication network comprising a network manager as set forth above, a network node as set forth above, a first target node and a second target node.

The invention will be better understood by the following detailed description, given by way of example and not of limitation, to be read with reference to the accompanying drawings.

BEST MODE FOR CARRYING OUT THE INVENTION

Figure 1:
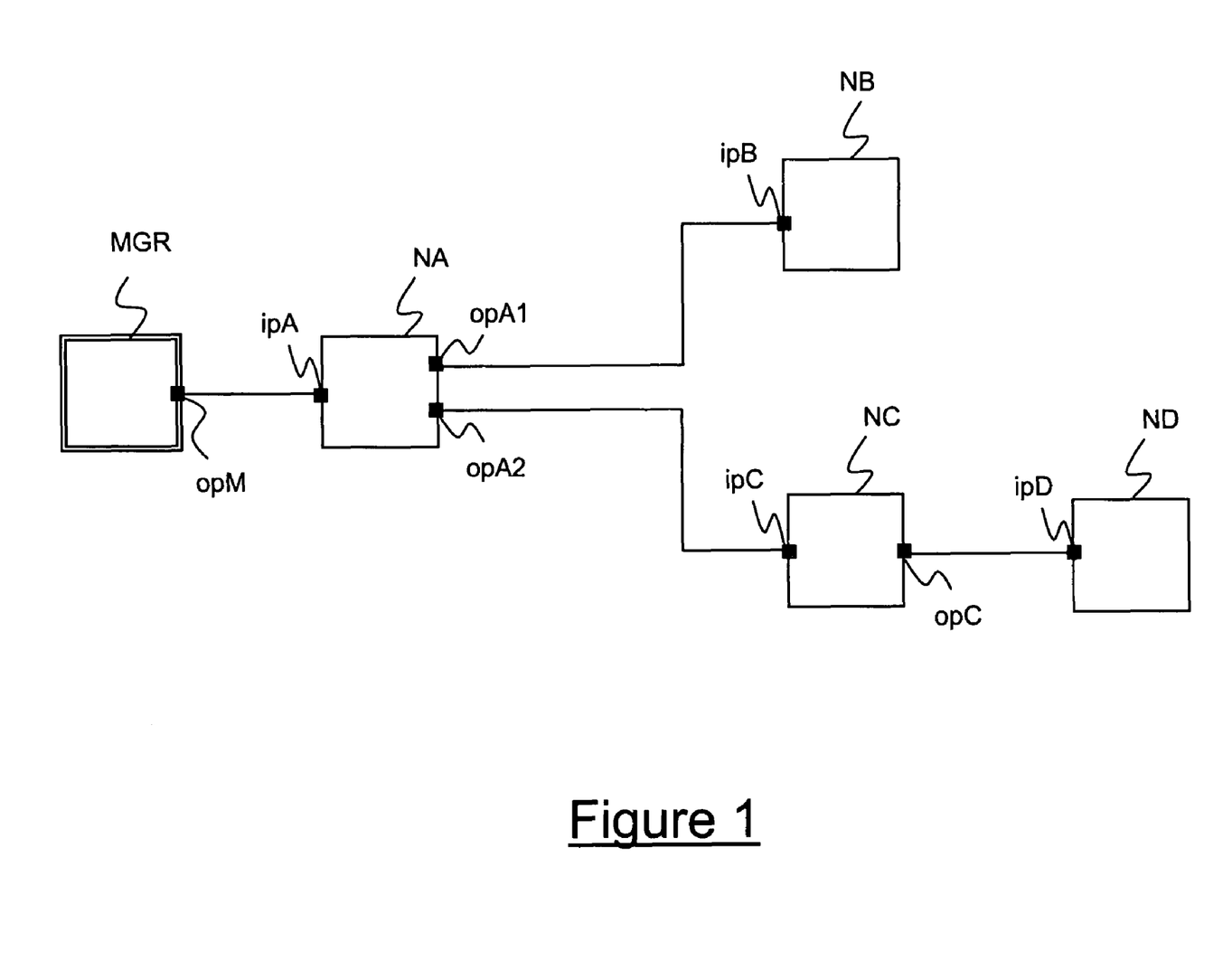
FIG. 1 schematically shows a telecommunication network which is adapted to implement the method according to the present invention.

FIG. 1 schematically shows a basic telecommunication network, which is adapted to implement the method of distributing data according to the present invention.

The network of FIG. 1 comprises a network manager MGR (for instance, the NOC of an SDH network), a node NA connected to the network manager MGR, two nodes NB, NC connected to the node NA, and a node ND connected to the node NC.

The input/output ports of each node are indicated by square markers. In particular, the node NA has an input port ipA which is connected to the output port opM of the network manager MGR, an output port opA1 which is connected to an input port ipB of the node NB, and an output port opA2 which is connected to an input port ipC of the node NC. The node NC further has an output port opC which is connected to an input port ipD of the node ND. Besides, the nodes NB and ND have no output port configured.

The network of FIG. 1 is only exemplary. Indeed, the method according to the present invention can be applied to any network, comprising any number of nodes arranged according to any topology (bus, ring, mesh, or the like), as it will be shown herein after.

Figure 2A:
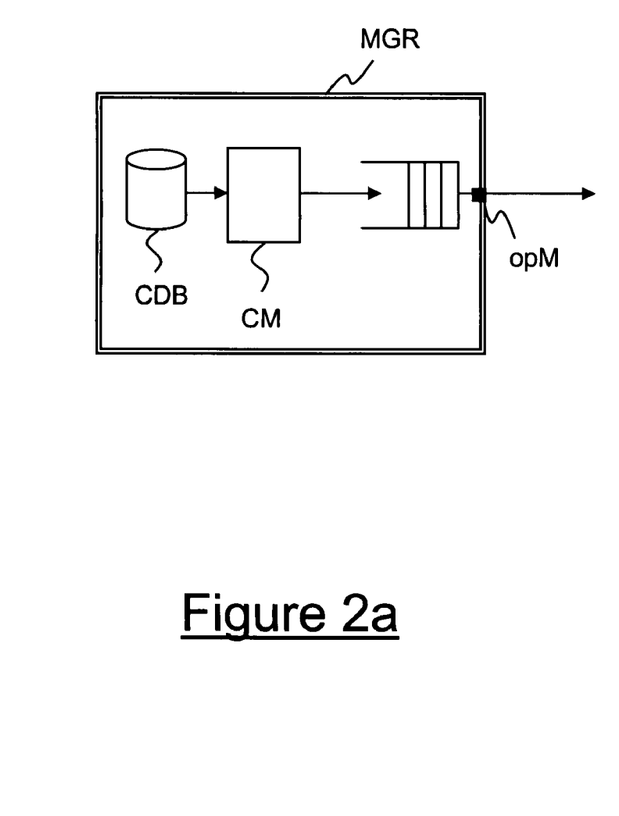
FIGS. 2a and 2b schematically show a scheme of the network manager and of an exemplary node of the network of FIG. 1, according to the present invention.

FIG. 2a shows an exemplary structure of the network manager MGR according to the present invention. The network manager MGR comprises a centralised database CDB, a compression module CM and at least an output port (FIG. 2a only shows a single output port opM).

Figure 2B:
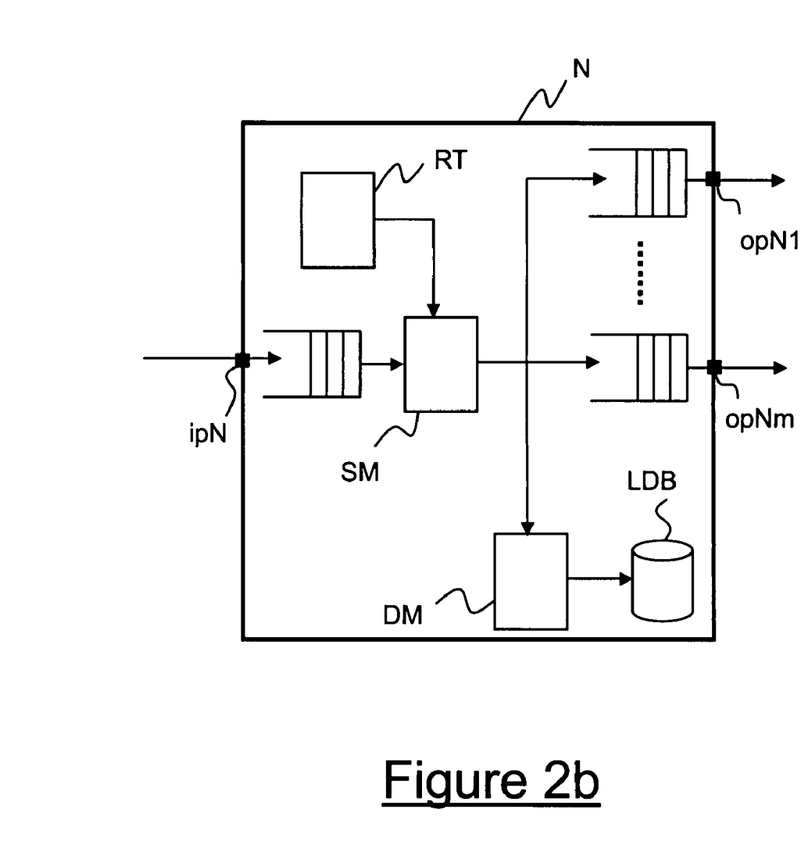

FIG. 2b shows an exemplary structure of one of the nodes NA, NB, NC, ND of FIG. 1 (generically indicated as N), according to the present invention.

The node N comprises an input port ipN, connected to a splitting module SM, which is in turn connected to a routing table RT. The splitting module SM is further connected to at least an output port (FIG. 2b shows m output ports opN1, ... opNm) and to a decompression module DM, whose output is connected to a local database LDB.

The network manager MGR and the node N may comprise other modules and other input/output ports, which are not shown into the Figures and which will not be described, since they are not relevant to the present description.

Figure 3:
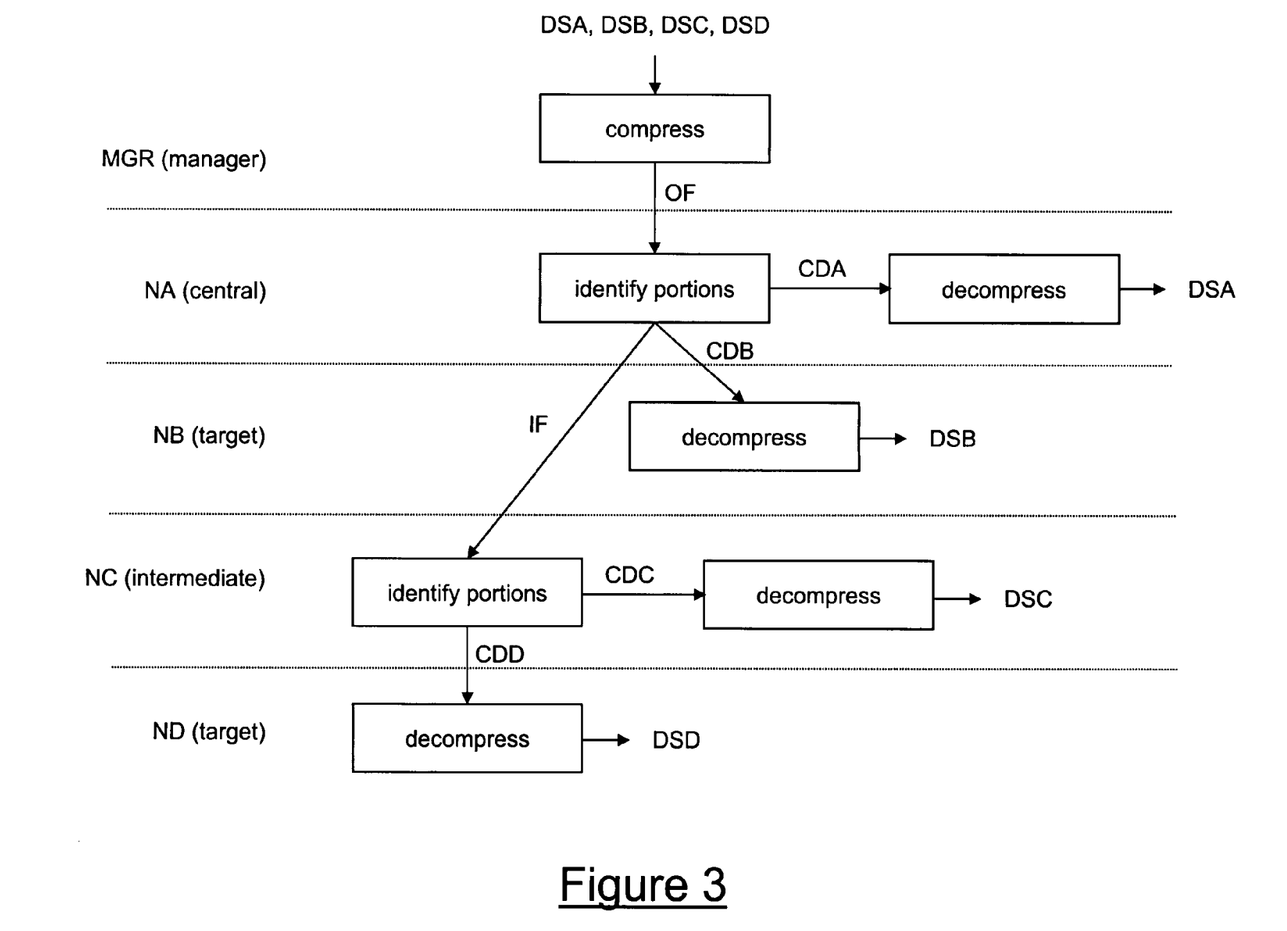
FIG. 3 shows a block diagram of some operations performed by the nodes of the network of FIG. 1.

By referring now to FIG. 3, the method of distributing data into the network of FIG. 1 will be briefly described. Further details about the method of the invention will be provided herein after by referring to FIGS. 4 and 5.

It is assumed that, e.g. after a failure into the network of FIG. 1, the network manager MGR has to restore the local databases LDB of the nodes NA, NB, NC, ND. For this purpose, the network manager has to send to each node NA, NB, NC, ND a respective data set DSA, DSB, DSC, DSD.

According to the present invention, the network manager MGR compresses all the data sets to be sent DSA, DSB, DSC, DSD, and inserts them into an overall file OF together with respective headers and additional information which will be used by each node for decompression, as it will be explained in further detail herein after.

The network manager MGR then sends such an overall file OF to the node NA.

According to the present invention, the node NA identifies into the file OF a number of portions, each portion comprising data addressed to a respective node. In FIG. 3, CDA, CDB, CDC, CDD indicate the portions addressed to NA, NB, NC, NC respectively. Data comprised into each portion may be not contiguous in time. The structure of each portion CDA, CDB, CDC, CDD will be described in further details herein after.

The node NA, after identifying its respective portion CDA, decompresses it, thus recovering its data set DSA. Further, the node NA forwards the portion CDB towards the node NB, and it also forwards an intermediate file IF, which comprises both CDC and CDD, to the node NC.

The node NB, upon reception of its portion CDB, decompresses it, thus recovering its data set DSB.

The node NC, upon reception of the intermediate file IF, identifies its portion CDC, and decompresses it, thus recovering its own data set DSC. Further, it forwards the portion CDD towards the node ND.

The node ND, upon reception of its portion CDD, decompresses it, thus recovering its data set DSD.

In the following description and in the claims, nodes which only perform decompression will be termed "target nodes". Besides, nodes which identify portions addressed to different nodes and which possibly perform decompression will be termed "intermediate nodes". Thus, in the network of FIG. 1, NB and ND are target nodes, while NC and NA are intermediate nodes. Intermediate nodes receiving data directly from the network manager MGR will be termed "central nodes". In FIG. 1, NA is the only central node of the network. The central node of a network may be designated upon network configuration. Alternatively, the central node may be automatically designated by the network manager.

By referring now to FIGS. 4 and 5, a possible implementation of the data set compression and of the creation of the overall file OF (both performed by the network manager MGR) will be described.

According to the present invention, the network manager reads, e.g., from its centralised database CDB, the data sets DSA, DSB, DSC, DSD, and compresses them by means of its compression module CM.

In a preferred embodiment of the present invention, the compression module CM of the network manager MGR is based on a compression algorithm with dictionary. Such compression algorithms with dictionary are known in the art.

They typically associate long or frequent byte sequences to respective symbols in order to build a dictionary. As known, a dictionary is a table wherein each entry associates a byte sequence to a respective symbol.

The Applicant has noticed that the data sets DSA, DSB, DSC, DSD may be strongly correlated the one with the others, i.e. they may comprise similar byte sequences. The strong correlation of data sets is mainly due to the fact that data distribution is often performed in networks with a high number of homogeneous nodes, which require substantially the same management information. Thus, according to the present invention, the compression algorithm is applied not to each data set separately, but it is applied to the whole of the data sets DSA, DSB, DSC, DSD. This is symbolically shown in FIG. 4 with a dashed squared enclosure. The evaluation of long or frequent byte sequences is thus performed on the whole of the data sets DSA, DSB, DSC, DSD.

Preferably, the compression algorithm with dictionary employed by the network manager MGR according to the present invention is capable of recognising (i.e. of associating to a single symbol) very long sequences, possibly corresponding to a whole data set, thus obtaining particularly high compression rates (for instance, the LZMA algorithm).

The compression algorithm thus builds a dictionary with n entries E1, E2, ... En, wherein each entry associates a byte sequence Seq1, Seq2, ... Seqn to a respective symbol S1, S2, ... Sn.

Figure 4:
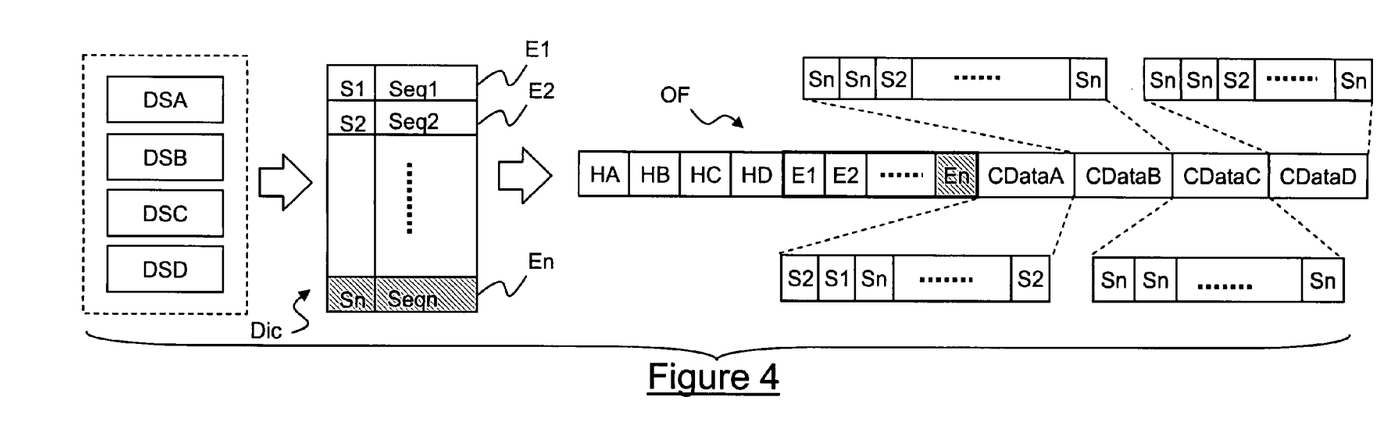
FIG. 4 schematically shows the application of a known compression algorithm with dictionary according to the present invention.

Even though not shown in FIG. 4, the compression algorithm with dictionary may also associate a long or frequent symbol sequence to a single symbol. For instance, if the symbol sequence "S1, S2" is repeated more than once, it can be replaced by a single symbol Sk. Therefore, for example, it is possible to replace a whole data set by a single symbol. Thus, in FIG. 4, Seq1, Seq2, ... Seqn may indicate either a byte sequence or a symbol sequence.

Once the dictionary Dic has been built, the compression algorithm replaces each byte sequence Seq1, Seq2, ... Seqn of the data sets DSA, DSB, DSC, DSD with the respective symbol S1, S2, ... Sn, thus obtaining the compressed data sets CDataA, CDataB, CDataC, CDataD.

A symbol may be included into a single compressed data set; alternatively, it may be included in more than one compressed data set; alternatively, it may be included in all the compressed data sets. By way of example, by referring to FIG. 4, the symbol S1 is included only in CDataA. Besides, the symbol S2 is included in CDataA, CDataB, CDataD, but not it is not included in CDataC. Besides, the symbol Sn is included in all the compressed data sets CDataA, CDataB, CDataC, CDataD. For simplicity, the other symbols of the dictionary Dic are omitted.

By referring to FIG. 5, the structure of the overall file OF generated by the network manager MGR will be described.

The file OF comprises an uncompressed header HA, HB, HC, HD for each compressed data set CDataA, CDataB, CDataC, CDataD. Each uncompressed header may comprises one or more of the following information:
- destination node identifier. In a preferred embodiment, such a destination node identifier is the IP address of the destination node;
- data set name;
- update version;
- base version;
- compressed data set offset;
- compressed data set size (expressed in words);
- symbols of the dictionary Dic included into the respective compressed data set. For instance, with reference to FIG. 4, HA comprises S1, S2 and Sn; HB comprises S2 and Sn, HC comprises Sn, and HD comprises S2 and Sn (for simplicity, the other symbols included into the headers are omitted).

According to the present invention, the overall file OF further comprises all the dictionary entries E1, E2, ... En.

Finally, the overall file OF comprises the compressed data sets CDataA, CDataB, CDataC, CDataD.

The Applicant has noticed that, thanks to the application of a compression algorithm with dictionary to the whole of the data sets, the overall file OF size is particularly reduced in comparison with the sizes of the single data sets DSA, DSB, DSC, DSD. Indeed, according to the invention, the overall file OF must simply comprise the dictionary Dic, which contains all the byte sequences comprised into the data sets DSA, DSB, DSC, DSD, and the compressed data sets CDataA, CDataB, CDataC, CDataD.

The Applicant has performed some tests applying a LZMA compression algorithm (Lempel-Ziv-Markov chain-Algorithm), to different data sets.

The Applicant has noticed that compression efficiency increases by increasing the number of data sets to be compressed, in particular if such data sets are highly correlated. For instance, compression of two copies of a same data set results in a file OF whose size is substantially unchanged if compression involves three or four copies of the same data set.

As already mentioned, after creating the overall file OF, the network manager MGR sends such a file OF to the central node NA (see FIGS. 1 and 3). Networks with higher number of nodes and more complex topology may comprise more than one central node.

Herein after, by referring to FIG. 5, the operation of the nodes of the network of FIG. 1 will be described in further detail.

The central node NA starts receiving the file OF from the network manager MGR. Firstly, the central node NA receives the header HA. The splitting module SM of NA identifies HA as the header of its own data set, and therefore forwards the header HA to its own decompression module DM.

Afterward, NA receives the header HB. NB thus compares the destination node identifier comprised into HB with its own routing table RT.

According to a preferred embodiment of the present invention, the destination node identifier is the destination node IP address. Therefore, the routing table RT is an IP routing table. As it is known, an IP routing table associates to a range of IP addresses an output port towards which data addressed to nodes whose IP addresses are comprised in such a range must be forwarded.

By referring to the network topology of FIG. 1, in the routing table RT of NA, it is assumed that the NB IP address belongs to the IP address range associated to opA1, while the NC and ND IP addresses belong to the IP address range associated to opA2.

The splitting module of NA, by comparing the destination node identifier of HB with its IP routing table, identifies HB as the header of data addressed to NB, and thus sends HB towards its port opA1.

Then, NA receives the header HC. Again, the splitting module of NA, by comparing the destination node identifier of HC with its IP routing table, identifies HC as the header of data addressed to NC, and thus sends HC towards its port opA2.

Then, NA receives the header HD. Again, the splitting module of NA, by comparing the destination node identifier of HD with its IP routing table, identifies HD as the header of data addressed to ND, and thus sends HD towards its port opA2.

NA then starts receiving dictionary entries E1, E2, . . . En. The splitting module, according to the information comprised in to the headers HA, HB, HC, HD, forwards each entry E1, E2, . . . En towards its own decompression module DM and/or towards opA1 and/or towards opA2.

For instance, as the symbol S1 is comprised only in HA, E1 is forwarded only to the NA decompression module. Besides, as the symbol S2 is comprised in HA, HB, HD, E2 is forwarded to the NA decompression module, to opA1 and to opA2. And so on, until En which is forwarded to the NA decompression module, to opA1 and to opA2, the symbol Sn being comprised in HA, HB, HC, HD.

Finally, NA receives successively the compressed data sets CDataA, CDataB, CDataC, CDataD. CDataA is forwarded to the NA decompression module, CDataB is forwarded to opA1, while CDataC, CDataD are forwarded to opA2. NA is able to identify the starting symbol and the ending symbol of each compressed data set CDataA, CDataB, CDataC, CDataD by reading the compressed data set offset and the compressed data set size comprised into each respective header HA, HB, HC, HD.

Figure 5:
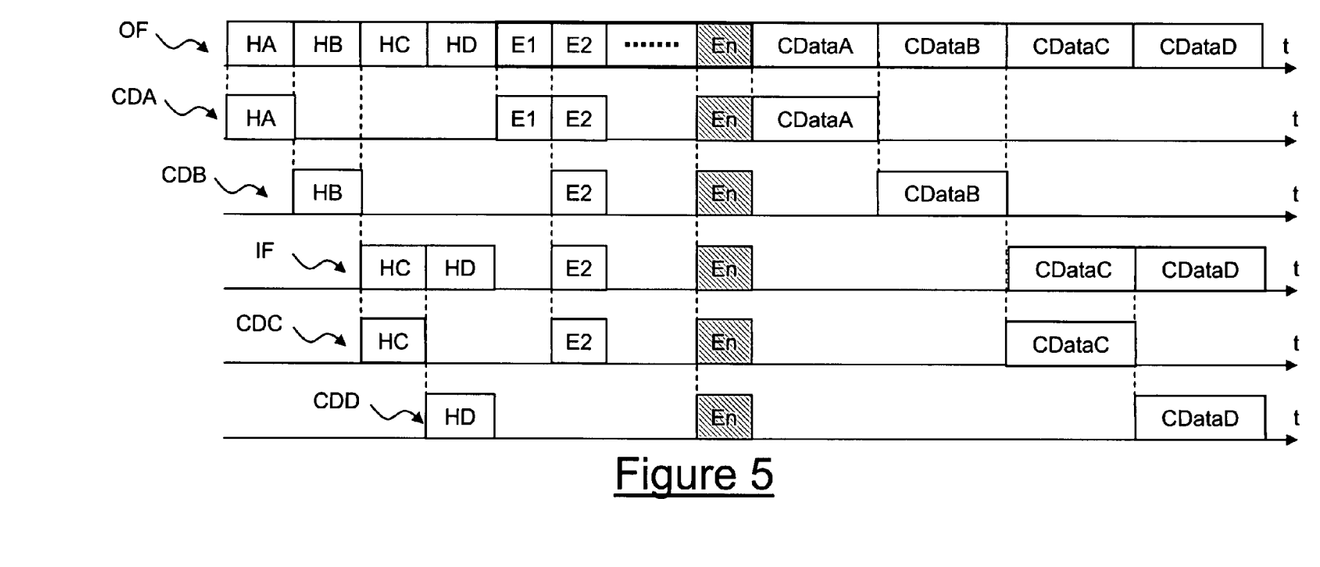
FIG. 5 schematically shows the structure of an overall file generated by the network manager and its distribution to the nodes of the network of FIG. 1 according to the present invention.

It can be noticed that, according to the present invention, data of the overall file OF are processed by NA (and in particular by its splitting module SM) substantially as they are received, unless processing delays which are not shown in FIG. 5, without waiting for the reception of the whole overall file OF. This advantageously allows to reduce both the amount of memory required for processing, and the processing time at node NA.

Once received the whole portion CDA, NA, by means of the dictionary entries extracted from the dictionary Dic, decompresses the compressed data set CDataA, thus recovering its own data set DSA, and writes it into its own local database LDB.

Similarly, once received the whole portion CDB, NB, by means of the dictionary entries extracted from the dictionary Dic, decompresses the compressed data set CDataB, thus recovering its own data set DSB, and writes it into its own local database LDB.

NC, once received the intermediate file IF through opA2, identifies into the file IF the two portions CDC and CDD, as described above by referring to NA operation.

In brief, NC receives HC, and by reading the destination node identifier, identifies HC as the header of its own data. Thus, NC forwards HC to its own decompression module DM.

Then, NC receives HD, and by comparing the destination node identifier with its own routing table, identifies HD as the header of data addressed to ND. Thus, NC forwards HD to opC.

Then, NC receives the dictionary entries. As S2 is only comprised in HD, E2 is forwarded only to opC. Besides, as Sn is comprised both in HC and HD, NC forwards En both to its own decompression module and to opC.

Finally, NC receives the compressed data sets CDataC, CDataD, and thus sends them towards its own decompression module and opC, respectively.

Then, NC, by means of the dictionary entries extracted from the dictionary Dic, decompresses the compressed data set CDataC, thus recovering its own data set DSC, and writes it into its own local database LDB.

Similarly, once received the whole portion CDD, ND, by means of the dictionary entries extracted from the dictionary Dic, decompresses the compressed data set CDataD, thus recovering its own data set DSD, and writes it into its own local database LDB.

Therefore, all the local databases of nodes NA, NB, NC, ND are updated/restored.

Profitably, according to the present invention, each node NA, NB, NC, ND sends to the network manager MGR a notification about the success of the updating/restoring operation. In particular, each node is adapted to send to the manager MGR two types of notification:
"node ready for update" notification, which indicates that the updating/restoring operation has been successful; and
"target node updated" notification, which indicates that the node is restarting as a consequence of receiving an "apply" command or a time restart managed by a node scheduler.

It must be noticed that paths followed by data during a data distribution operations depend on how central and intermediate nodes are selected. Both the central nodes and the intermediate nodes are preferably dynamically selected, based on traffic conditions, number/position of nodes to be updated/restored, CPU usage, memory availability, or the like, in order to satisfy QoS requirements of the network.

Thus, preferably, according to the present invention, all the network nodes are capable of acting as central nodes, as intermediate nodes, or as target nodes. This advantageously allows to have maximum flexibility in optimising data distribution in a network.

Figure 6A:
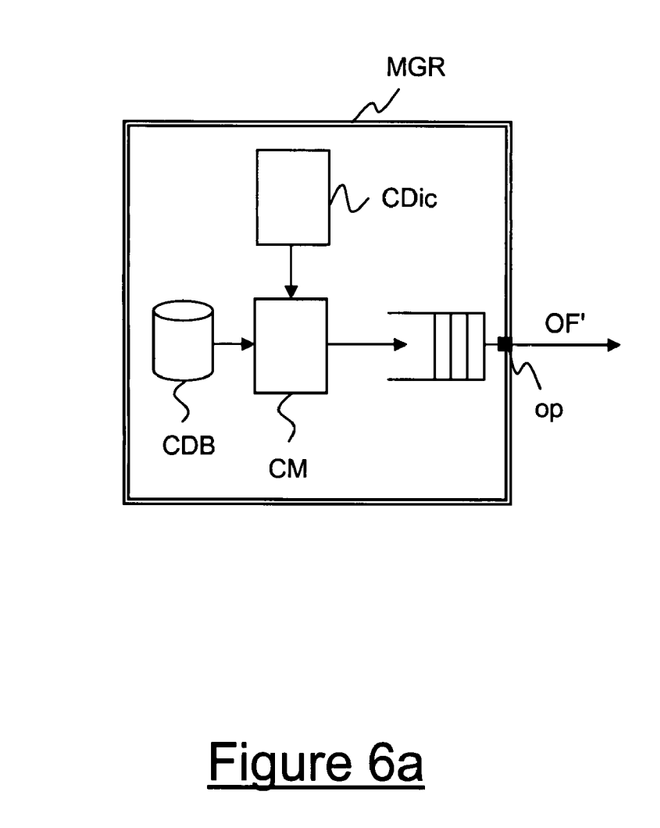
FIGS. 6a and 6b schematically show a scheme of the network manager and of an exemplary node of the network of FIG. 1, according to a preferred embodiment of the present invention.
Figure 6B:
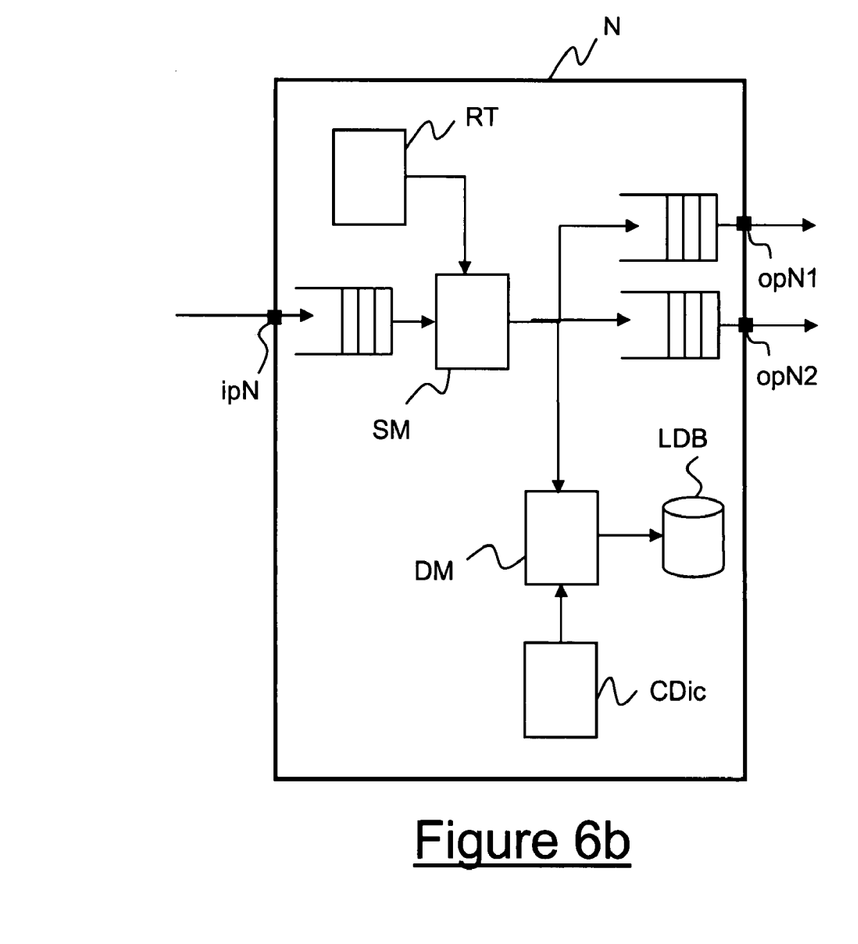

FIGS. 6a and 6b schematically shows the structure of a network manager MGR and a generic network node N according to an advantageous embodiment of the present invention.

According to this embodiment, a part of the dictionary (which will be termed "common dictionary") comprising dictionary entries corresponding to symbols which occur most frequently into the data sets to be distributed, is stored in each intermediate node and target node of the network, so that this common dictionary does not need to be sent to the nodes within the file OF each time a network manager performs a data distribution.

By still referring to FIG. 4, for instance, it is assumed that, among the dictionary symbols S1, S2, . . . Sn, Sn (whose entry En is shaded) is particularly frequent into the data sets which are commonly distributed by the network manager to nodes NA, NB, NC, ND. Such a symbol Sn is thus inserted into such a common dictionary CDic.

The common dictionary CDic, according to such an embodiment of the invention, is stored both at the network manager and at the network nodes (central nodes, intermediate nodes, target nodes). Thus, the network manager MGR of FIG. 6a has the common dictionary CDic, which is used by the compression module CM to perform compression of the data sets to be distributed. Similarly, the generic node N of FIG. 6b has the common dictionary CDic, which is used by the decompression module DM to perform decompression. More particularly, the decompression module DM of each node N is adapted to merge common dictionary entries with entries extracted from the overall file OF, so that each decompression module has all the dictionary entries required to decompress the received compressed data set.

This advantageously allows to further reduce the file OF size. Indeed, according to this advantageous embodiment, the file OF does not comprise all the dictionary entries E1, E2, . . . En, but only entries which are absent from the common dictionary CDic. Thus, the transmission time of the file OF is reduced, thus allowing to further reduce the network updating/restoring time.

As already mentioned, the method of the invention may be applied to different networks, with any number of nodes arranged according to any kind of topology. In particular, according to the number of nodes and topology, a network manager may either select a single central node or more than one central node, thus further decentralising data distribution.

Figure 7A:
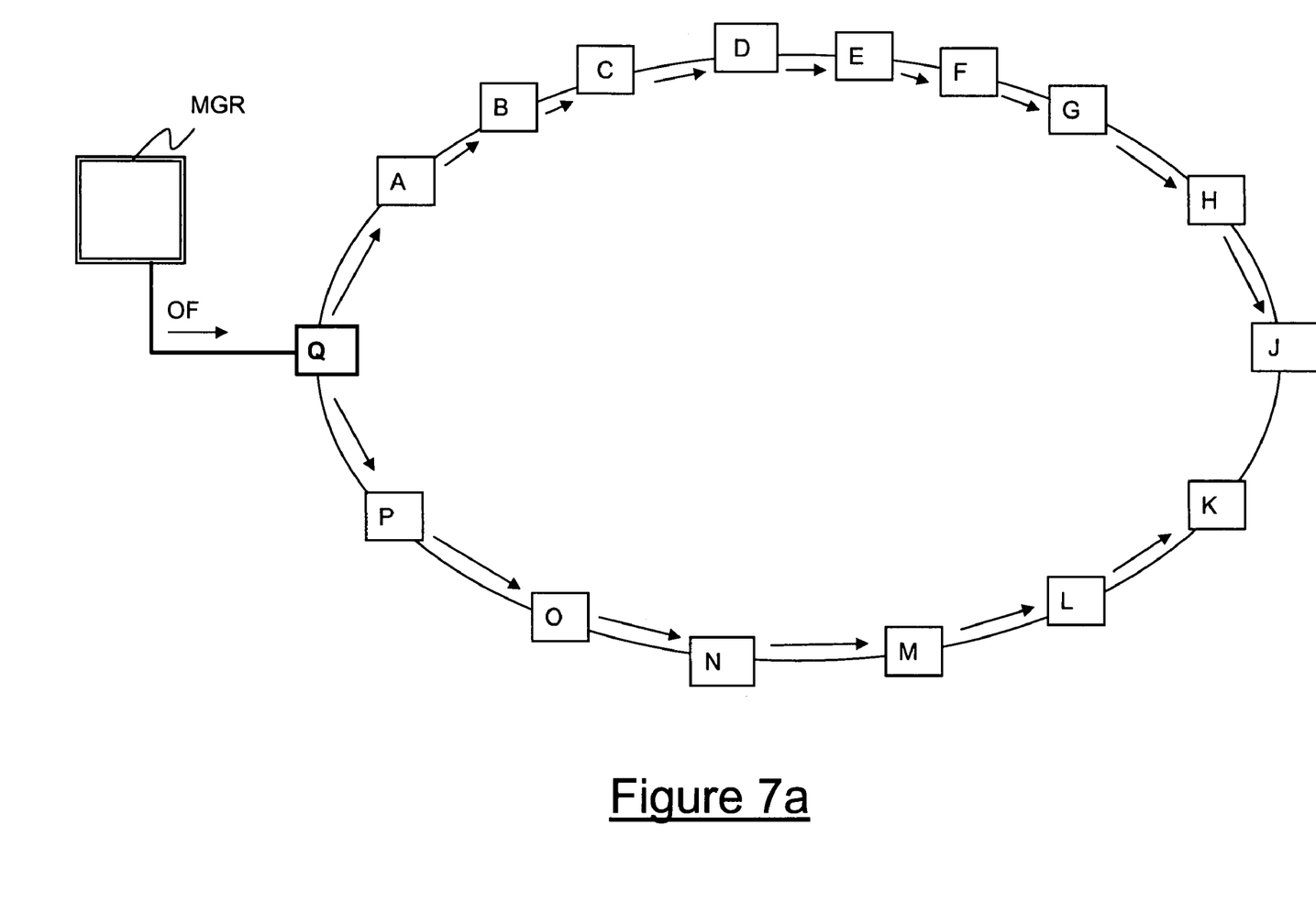
FIGS. 7a and 7b show two exemplary applications of the method according to the present invention in a ring network.
Figure 7B:
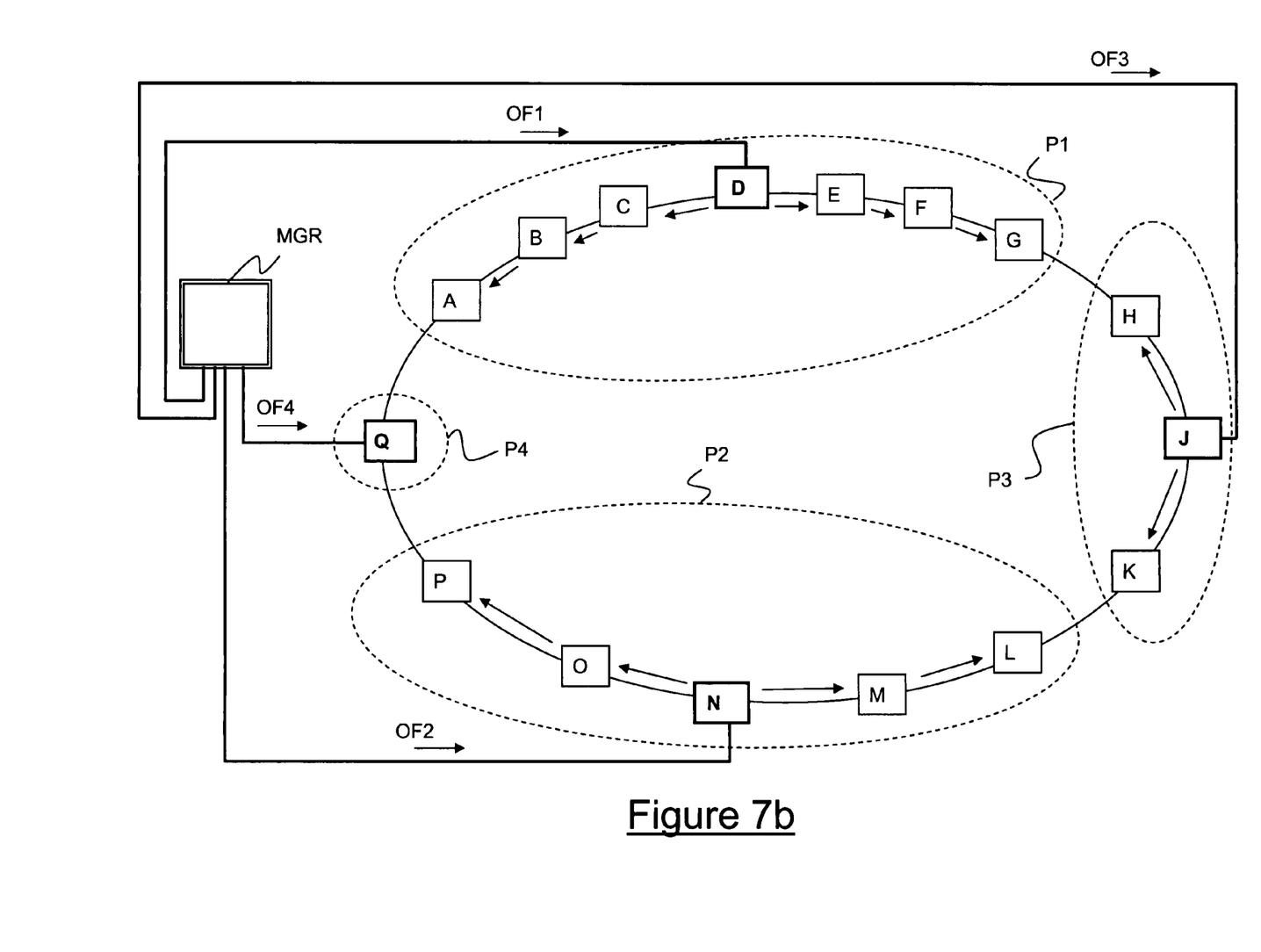

For instance, FIGS. 7a and 7b show two examples of application of the method according to the present invention to a ring network with sixteen nodes A, B, C . . . Q. Each node has a structure as shown either in FIG. 2a or in FIG. 6a.

It is assumed that the network manager MGR must restore the local databases of all the nodes of the ring network.

According to a first exemplary application of the method of the invention, which is shown in FIG. 7a, the network manager MGR reads, e.g. from its own centralised database, sixteen data sets, each data set being addressed to a respective node. The network manager MGR thus compresses the data sets in a single overall file OF, according to the method described above. Then, it forwards the file OF to the central node Q. The central node Q extracts from OF its own portion and decompressed it. Then, according to its own routing table, it forwards a first intermediate file comprising file portions addressed to A, B, . . . J to the intermediate node A, while it forwards a second intermediate file comprising file portions addressed to K, L, . . . P to the intermediate node P.

The node A receives such a first intermediate file from Q, it extracts its own portion and decompresses it. Then it forwards the remaining portions to the intermediate node B.

The node B performs the same operations, and so on, until the target node J.

Similarly, the node P receives such a second intermediate file from Q, it extracts its own portion and decompresses it. Then it forwards the remaining portions to the intermediate node O.

The node O performs the same operations, and so on, until the target node K.

Thus, all the network nodes receive their own data sets. However, data distribution into the ring network of FIG. 7a can be further optimised.

In a second exemplary application of the method according to the present invention, which is shown in FIG. 7b, the network manager MGR firstly divides the ring network into four partitions P1, P2, P3, P4. P1 comprises A, B, . . . G; P2 comprises L, M, . . . P; P3 comprises H, J, K; and P4 comprises Q.

For each partition, the network manager MGR creates a respective overall file OF1, OF2, OF3, OF4, each overall file comprising data sets addressed to nodes belonging to the respective partition. For each partition, the network manager MGR then selects a respective central node which is adapted to receive the respective overall file OF1, OF2, OF3, OF4. In FIG. 7b, for instance, it is advantageous to select as central nodes the halfway node of each partition, i.e. D for P1, N for P2, J for P3 and Q for P4.

The network manager then sends OF1 to the central node D of P1. The central node D extracts from OF1 its own portion and decompressed it. Then, according to its own routing table, it splits the remaining portions, i.e. it forwards the portions addressed to A, B, C to the intermediate node C, while it forwards the portions addressed to E, F, G to the intermediate node E.

The intermediate node C receives from D the portions addressed to A, B, C, it extracts its own portion, it decompresses it, and it forwards the remaining portions to B. And so on. The same happens to nodes E, F, G.

After sending OF1 to the central node D, without waiting for the completion of data distribution into partition P1, the network manager MGR sends OF2 to the central node N of the partition P2. The central node N, similarly to the central node D, extracts from OF2 its own portion and decompressed it. Then, according to its own routing table, it splits the remaining portions, i.e. it forwards the portions addressed to O, P to the intermediate node O, while it forwards the portions addressed to M, L to the intermediate node M. And so on.

After sending OF2 to the central node N, without waiting for the completion of data distribution into partitions P1 and P2, the network manager MGR sends OF3 to the central node J of the partition P3. The central node J, similarly to the central nodes D and N, extracts from OF3 its own portion and decompressed it. Then, according to its own routing table, it splits the remaining portions, i.e. it forwards to the target node H the portion addressed to H, while it forwards to the target node K the portion addressed to K.

Finally, without waiting for the completion of data distribution into partitions P1, P2 and P3, the network manager MGR sends OF4 to the node Q. OF4 may simply be the uncompressed data set addressed to Q, since compression at the network manager MGR can be optionally disabled.

Therefore, data distribution occurs simultaneously in different parts of the network, thus further reducing the overall updating/restoring time of the network.

Thus, advantageously, the method according to the present invention allows to reduce the overall updating/restoring time of the network for the following reasons.

Firstly, compressing the data sets to be distributed, for a given management channel bandwidth, allows to send a higher number of data sets at the same time, thus allowing to update/restore a higher number of nodes with a single distribution operation, in comparison to known distribution methods. According to the invention, compression is particularly efficient, since compression algorithm is applied not to each data set separately, but to it is applied to the whole of the data sets to be sent. As data sets, as the Applicant has observed, are generally strongly correlated, this results in a particularly high compression rate.

Moreover, each node is capable of identifying its respective file portions and forwarding file portions addressed to different nodes without decompressing files, thus implying a reduction of processing time in comparison with the known methods. In a preferred embodiment, processing is performed "on-the-fly", i.e. data are processed as they are received, without waiting for the whole file reception.

Finally, the network manager, according to the present invention, distributes data sets not directly to each target node, but each node is able to distribute data to the adjacent nodes. Therefore, data distribution is no more centralised, thus allowing to have parallel data distributions inside a network. In particular, in cases wherein the network manager selects more than one central node, each node is responsible of distributing data in a respective partition. In such cases, data distribution time can be minimised by properly selecting central nodes and partition, based on traffic condition, network topology, and the like.

We claim:

1. A method of distributing data in a telecommunication network, said network comprising a central node, a first target node and a second target node, wherein the method comprises:

providing a first data set addressed to a said first target node and a second data set addressed to said second target node;

applying a compression algorithm to the whole of the first and second data sets, the algorithm recognizing whenever a sequence of data is present in multiple ones of said data sets and associating the sequence to a symbol for use in the compression of each of the multiple data sets, to provide a first file comprising at least a first compressed data set addressed to said first target node and a second compressed data set addressed to said second target node;

identifying in said first file at least a first file portion comprising said first compressed data set and a second file portion comprising said second compressed data set; and forwarding said first file portion to said first target node, and forwarding said second file portion to said second target node, wherein said steps of identifying and forwarding are performed in said central node;

wherein said network includes an intermediate node connected between said central and first nodes, further comprising the steps of:

providing a third data set addressed to a said intermediate node; applying said compression algorithm to a data set including the whole of the first and third data sets, so that the first file includes a first compressed data set addressed to said first target node and additionally a third compressed data set addressed to the intermediate node;

identifying in said first file said first file portion, wherein said first file portion comprises said first compressed data set and said third compressed data set;

forwarding said first file portion to said intermediate node;

identifying at the intermediate node, in said first file portion, the third compressed data set;

recovering the third compressed data set at the intermediate node; and forwarding the first compressed data set from the intermediate node to said first target node without the third compressed data set.

2. The method of claim 1, wherein it further comprises identifying, at said central node, a third file portion of said first file, said third file portion including an additional compressed data set and being addressed to said central node.

3. The method of claim 1, wherein said step of forwarding further comprises the step of forwarding in said central node said first file portion to said first target node through at least one intermediate node.

4. The method of claim 3, further comprising:

receiving a second file comprising at least said first compressed data set addressed to said first target node;

identifying in said second file at least said first file portion; and forwarding said first file portion to said first target node, wherein said last-mentioned steps of identifying and forwarding are performed in said at least one intermediate node.

5. The method of claim 4, further comprising:

in said at least one intermediate node, identifying in said second file at least a fourth file portion which is addressed to said at least one intermediate node.

6. The method of claim 1, wherein the step of applying a compression algorithm comprises compressing at least said first and second data sets through a compression algorithm with a dictionary.

7. The method of claim 6, wherein the step of providing a first file comprises a step of including at least a part of said dictionary in said first file.

8. The method of claim 1, wherein the step of providing a first file further comprises providing said first compressed data set with a first header which includes an identifier of said first target node, and providing said second compressed data set with a second header which includes an identifier of said second target node.

9. A network manager of a telecommunication network, said telecommunication network comprising a central node, a first target node and a second target node, wherein said network manager comprises a compression module for compressing a first data set addressed to said first target node and a second data set addressed to said second target node, the compression module applying a compression algorithm to the whole of said first and second data sets, the algorithm recognizing whenever a sequence of data is present in multiple ones of said data sets and associating the sequence to a symbol for use in the compression of each of the multiple dam sets, thus providing a first compressed data set and a second compressed data set, and further wherein said compression module provides a first file comprising at least said first compressed data set and said second compressed data set, the network manager further comprising transmission means for transmitting said first file to said central node;

wherein said network includes an intermediate node connected between said central and first nodes, further comprising the steps of:

providing a third data set addressed to a said intermediate node; applying said compression algorithm to a data set including the whole of the first and third data sets, so that the first file includes a first compressed data set addressed to said first target node and additionally a third compressed data set addressed to the intermediate node:

identifying in said first file a first file portion, wherein said first file portion comprises said first compressed data set and said third compressed data set;

forwarding said first file portion to said intermediate node;

identifying at the intermediate node, in said first file portion, the third compressed data set;

recovering the third compressed data set at the intermediate node; and forwarding the first compressed data set from the intermediate node to said first target node without the third compressed data set.

10. The network manager of claim 9, wherein said compression module applies a compression algorithm with a dictionary and wherein said first file includes at least a part of the dictionary.

11. The network manager of claim 9, wherein said compression module is also adapted to include in said first file a first header which includes an identifier of said first target node and a second header which includes an identifier of said second target node.

12. A network node of a telecommunication network, the network including a management channel, said node comprising:

a receiver for receiving a first file from a network manager over the management channel, the first file comprising at least a first compressed data set of management information addressed to a first target node and a second compressed data set addressed to a second target node, wherein said first and second compressed data sets are characterized by having been generated by the application of a compression algorithm to the whole of first and second data sets addressed to the first and second target nodes, respectively, the algorithm recognizing whenever a sequence of data is present in multiple ones of said first and second data sets addressed to the first and second target nodes and associating the sequence to a symbol for use in the compression of each of the multiple data sets;

an identifying module for identifying in said first file at least a first file portion comprising said first compressed data set and a second file portion comprising said second compressed data set; and a forwarder for forwarding said first file portion to said first target node over the management channel, and forwarding said second file portion to said second target node over the management channel;

said telecommunication network further comprising an intermediate node, said network node additionally including a third compressed data set addressed to the intermediate node and generated by the application of said algorithm to a data set including file whole of the first and third data sets, so that said first file comprises a first compressed data set addressed to said first target node and additionally a third compressed data set addressed to said intermediate node:

said identifying module identifying in said first file said first file portion, wherein said first file portion comprises said first compressed data set and said third compressed data set;

said forwarder forwarding the first file portion to the intermediate node;

said intermediate node including an identifying means for identifying the third compressed data set in said first file portion;

a splitting module for recovering the third compressed data set from the first file portion; and means for forwarding the first compressed data, set, without the third compressed data set, to said first target node.

13. The network node of claim 12, wherein said first file further comprises a third compressed data set addressed to said network node, wherein said network node further comprises a decompression module for decompressing said third compressed data set and a database for storing the decompressed data set.

14. The network node of claim 12, wherein said third compressed data set is compressed by applying a compression algorithm with a dictionary, wherein said network node comprises a common dictionary.

15. A telecommunication network comprising a central node, a first target node and a second target node, and further comprising a network manager having a compression module for compressing a first data set addressed to said first target node and a second data set addressed to said second target node, the compression module applying a compression algorithm to the whole of said first and second data sets, the algorithm recognizing whenever a sequence of data is present in multiple ones of said data sets and associating the sequence to a symbol for use in the compression of each of the multiple data sets, thus providing a first compressed data set and a second compressed data set, respectively, and wherein said compression module provides a first file comprising at least said first compressed data set and said second compressed data set, the network manager further including transmission means for transmitting said first file to said central node, said network further comprising a network node according to claim 12.

16. The method of claim 1, including the step of decompressing the third compressed data set at the intermediate node.

17. The network of claim 12, wherein the intermediate node further includes a decompression module for decompressing the third compressed data set.

18. The telecommunication network of claim 12, further comprising a network manager having a compression module for performing said applications of the compression algorithm, thus providing said first compressed data set, said second compressed data set, and third compressed data set, said compression module further providing said first file portion including said first file portion including said first and third compressed data sets, and said second file portion comprising said second compressed data set, the network manager further including transmission means for transmitting said first and second file portions to said network node.

* * * * *